United States Patent [19]

Pantke et al.

[11] 4,388,744
[45] Jun. 21, 1983

[54] MOTOR VEHICLE HINGE

[75] Inventors: Reinhard Pantke, Monsheim; Konrad Hofmann, Schwieberdingen, both of Fed. Rep. of Germany

[73] Assignee: Dr. Ing. h.c.F. Porsche Aktiengesellschaft, Fed. Rep. of Germany

[21] Appl. No.: 208,074

[22] Filed: Nov. 18, 1980

[30] Foreign Application Priority Data

Nov. 23, 1979 [DE] Fed. Rep. of Germany ....... 2947202

[51] Int. Cl.$^3$ ................................................ E05D 3/04
[52] U.S. Cl. ........................................ 16/273; 16/368; 16/386
[58] Field of Search ................. 16/386, 378, 273, 368; 411/504, 501; 403/161, 162; 248/479; 29/11; 148/127

[56] References Cited

U.S. PATENT DOCUMENTS

| | | | |
|---|---|---|---|
| 2,091,673 | 8/1937 | Orlow | 16/368 |
| 2,562,336 | 7/1951 | Selden | 411/501 |
| 3,117,708 | 1/1964 | Goldman | 403/161 X |
| 3,169,418 | 2/1965 | Borowsky | 29/11 X |
| 3,561,792 | 2/1971 | Cycowicz | 403/162 X |
| 3,704,509 | 12/1972 | Yamauchi | 148/127 |
| 4,315,614 | 2/1982 | Stegenga et al. | 403/162 X |

FOREIGN PATENT DOCUMENTS

| | | | |
|---|---|---|---|
| 238237 | 5/1960 | Australia | 148/127 |
| 533276 | 11/1956 | Canada | 16/386 |

OTHER PUBLICATIONS

*The Making, Shaping and Treating of Steel*, Seventh Ed., United States Steel, Pittsburgh, Pa., 1957, p. 560.

Primary Examiner—Werner H. Schroeder
Assistant Examiner—Andrew M. Falik
Attorney, Agent, or Firm—Craig & Burns

[57] ABSTRACT

A hinge for motor vehicle hood, trunk lids or the like where a plurality of arms are connected by pivot-forming rivets and spacer rings are provided between the arms with at least one of the spacer rings being made of a thermoplastic material and the hinge being annealed after the setting of the rivet about which the thermoplastic spacer ring is located. As a result, prestressing of the thermoplastic spacer ring created by the rivet setting is relieved. Spacer rings are provided between the original head of each rivet and an adjacent one of said arms as well as at an opposite side of the adjacent arms. Furthermore, the thickness of the spacing ring located at the side of the adjacent arms opposite from the original rivet head is of a thickness approximately double that of the spacer ring that is located between the original rivet and said adjacent arm.

6 Claims, 2 Drawing Figures

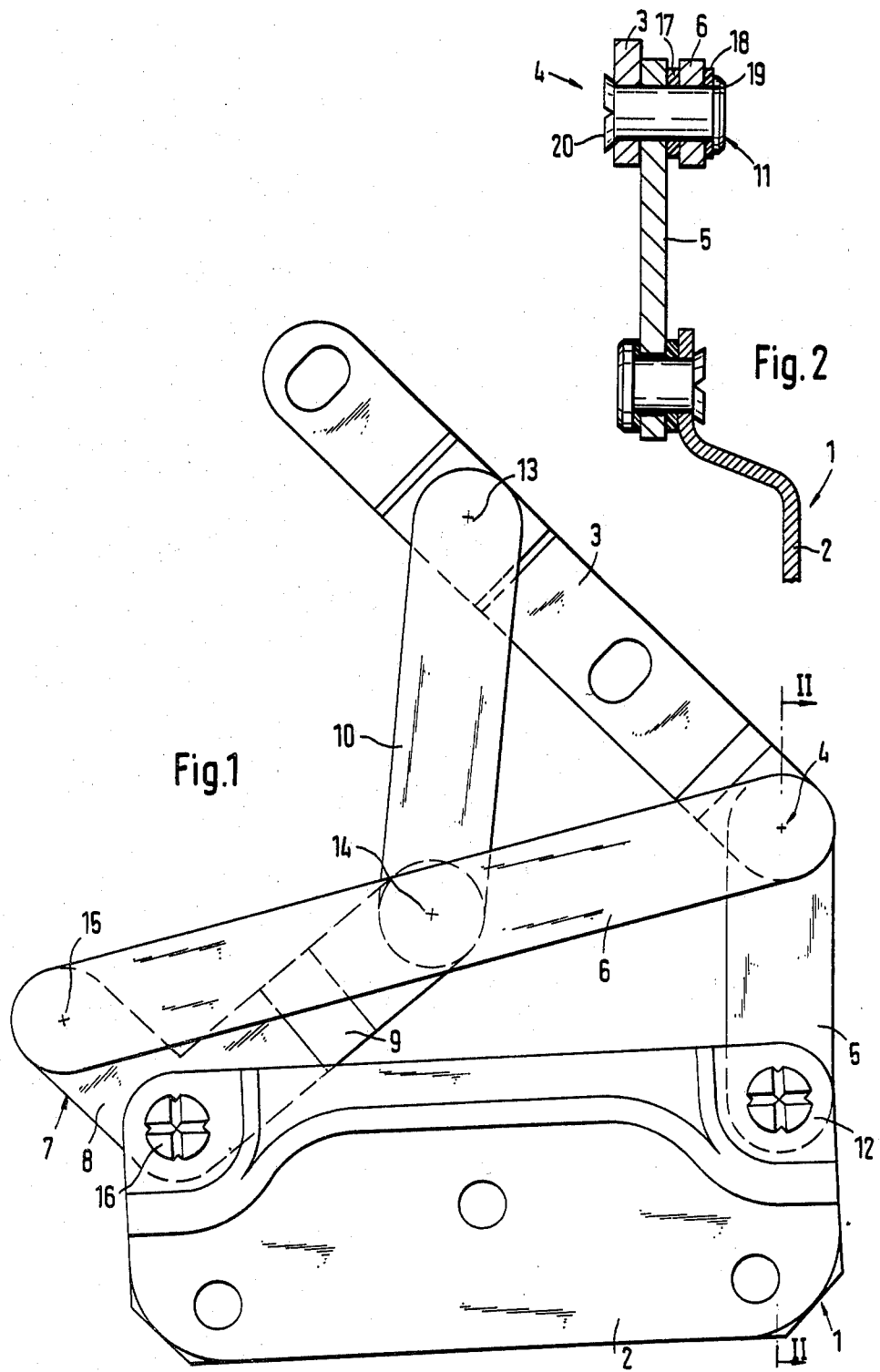

MOTOR VEHICLE HINGE

BACKGROUND AND SUMMARY OF THE INVENTION

The invention relates to a hinge, preferably an articulated hinge, for motor-vehicle hoods, trunk lids, or the like, whose arms are connected by pivot-forming rivets, and in which spacing rings are provided between the arms.

In a known hinge of the aforesaid type (German Auslegeschrift [patent application] 1,430,250) the arms can be particularly difficult to move when the rivet joint is too rigid. The resistance to motion may result in the lateral bending of the hinge arms due to their motional operation. If, on the contrary, the rivet joint is too loose the rivet play is excessive and results in a rattling noise. Therefore, it would be necessary to adjust exactly the rivet-setting force in the formation of the head, which is difficult in view of material and element tolerances. The hinge elements are made of steel, which increases the weight of the motor vehicle.

Therefore, the object of the invention is to provide a simply manufactured, light-weight hinge whose rivet joints move easily but substantially without play.

According to a preferred embodiment of the invention, this object is achieved by the provision of at least one spacing ring made of thermoplastic material between the rivet head and the arms, and between the arms. The thickness of the spacing ring located between the arms is approximately double that of the spacing ring located between the head and the arm. The hinge elements and the rivets are made of aluminum. The size of the rivet openings in the arms is determined so that the arm is connected rigidly to the rivet on the tail (closing head) side, and pivotably on the head side. In addition the hinge is heat treated at about 130° C. for approximately 30 minutes.

The primary advantage obtained from the invention is that the prestressing of the plastic spacing rings resulting from the heat treatment in the rivet-setting operation is relieved by rapid relaxation in the stable plastic deformation range, and therefore, in the entire rivet joint. Consequently, the hinge pivot joints are exposed to weak friction and substantially free of play. With this treatment the rivet-setting forces applied need not be exact. In addition the use of aluminum provides for lighter weight and the elimination of hinge element corrosion.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is a side view of a hinge according to a preferred embodiment of the invention;

FIG. 2 is a section along line II—II in FIG. 1.

DETAILED DESCRIPTION OF THE PREFERRED EMBODIMENT

The hinge 1 comprises a securing plate, which in use is mounted to the body of a motor vehicle (not represented), and an arm 3 which in use is fixed to a hood trunk lid or the like (also not represented). Arm 3 is connected at 4 to other arms 5 and 6. A bent lever 7 comprising legs 8 and 9 cooperates with arm 6. Leg 9 is connected to arm 4 by a support arm 10.

In FIG. 2, arms 3, 5 and 6 are shown held together by a rivet 11. Similar rivet joints are provided at 12, 13, 14, 15 and 16.

A spacing ring 17 made of thermoplastic material, such as a mixture of polyacetal with polytetrafluoroethylene is provided, between arms 5 and 6 which, as the other elements of the hinge, are made of aluminum. This plastic material exhibits good sliding properties in small rotating motions at low sliding speeds.

Another spacing ring 18 made of the same or similar material is arranged between the head 19 of rivet 11 and arm 6. Arm 6 is pivotable on the side of rivet head 19. In contrast, arm 3 is rigidly connected to the rail (closing head) 20 of rivet 11. Arm 5 is pivotably mounted on rivet 11. The size of the openings for rivets 11 in arms 3, 5, and 6 is determined accordingly.

In the embodiment no spacing ring is provided between arms 3 and 5, but such an element may be introduced when necessary.

To set the rivets, spacing rings 17 and 18 and arms 3, 5, and 6 are assembled on a bench. Then closing head 20 is formed by crossdie rivet setting.

Arms 5 and 6 or arm 6 and head 19 cooperate under prestressing.

To relieve the prestressing, the entire assembled hinge including the noted plurality of like rivet joints is heat treated. It has been found advantageous to conduct the treatment for 30 minutes at 130° C.

In this process, by accelerated relaxation in the stable plastic deformation range, spacing rings 17 and 18 reduce the prestressing so that the arms cooperate at the pivot points with weak friction and without play.

The prestressing is satisfactorily relieved when the thickness of spacing ring 17 located between arms 5 and 6 is approximately double that of spacing ring 18 located between head 19 and arm 6. Likewise, with the other rivet joints 12–16, the smaller thickness spacer 18 is located between the original head of the rivet and the arm located adjacent thereto, while the double thickness spacer is placed on the opposite side of the adjacent arm (i.e., the side facing toward the head formed during riveting).

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A motor vehicle hinge of the type used on a hood, trunk lid, or the like of a motor vehicle, comprising a plurality of rigid arms, spacer rings, at least one of which is formed of thermoplastic material, provided between the arms, and rivets extending through said rigid arms and spacer rings, said rivets being deformed in a manner holding adjacent surfaces of the arms and the at least one thermoplastic spacer ring in flush contact with one another, wherein prestressing of said thermoplastic spacer ring created by said deformation of the rivet holding said arms and thermoplastic spacer has been relieved by annealing of the hinge, whereby the arms are able to pivot while being substantially free of play.

2. The hinge as in claim 1, wherein spacing rings made of thermoplastic material are provided between the original head of each rivet and an adjacent surface of one of said arms and at an opposite surface of said adjacent arm.

3. A motor vehicle hinge of the type used on a hood, trunk lid, or the like of a motor vehicle, comprising
a plurality of rigid arms, spacer rings, at least one of which is formed of thermoplastic material, provided between the arms, and rivets extending through said rigid arms and spacer rings, said rivets being deformed in a manner holding adjacent surfaces of the arms and the at least one thermoplastic spacer ring in flush contact with one another, wherein prestressing of said thermoplastic spacer ring created by said deformation of the rivet holding said arms and thermoplastic spacer has been relieved by annealing of the hinge, whereby the arms are able to pivot while being substantially free of play,
spacer rings made of thermoplastic material are provided between the original head of each rivet and an adjacent surface of one of said arms and at an opposite surface of said adjacent arm, wherein
the thickness of the spacing ring located at said opposite side of said adjacent arm is approximately double the thickness of the spacing ring located between the original rivet head and the adjacent arm.

4. The hinge as in claim 1 or 3, wherein the arms of the hinge and the rivets are made of aluminum.

5. The hinge as in claim 1 or 3, wherein at least one of said arms is a mounting arm for fixed connection with a vehicle hood or trunk lid, said mounting arm being provided with rivet openings, the size of the openings for the rivets in the mounting arms being determined so that the mounting arm is connected rigidly to the rivet on a side adjacent a head formed during said rivet deformation, other of said arms connected to said mounting arm having rivet openings sized to enable pivoting thereof about a respective rivet.

6. The hinge according to claim 5, wherein some of said arms are connected to a securing plate for fixed connection with a body portion of said vehicle by pivot forming rivets in the same manner as the arms connected to said mounting arm.

* * * * *